United States Patent
Godshaw et al.

(10) Patent No.: US 6,568,576 B1
(45) Date of Patent: May 27, 2003

(54) CELL PHONE POUCH

(75) Inventors: Donald E. Godshaw, Evanston, IL (US); Andrezj E. Redzisz, Skokie, IL (US)

(73) Assignee: Travel Caddy Inc,, Des Plaines, IL (US)

(*) Notice: Subject to any disclaimer, the term of this patent is extended or adjusted under 35 U.S.C. 154(b) by 0 days.

(21) Appl. No.: 09/921,122

(22) Filed: Aug. 2, 2001

Related U.S. Application Data

(60) Provisional application No. 60/222,712, filed on Aug. 3, 2000.

(51) Int. Cl.[7] .................................................. A45F 3/04
(52) U.S. Cl. ..................... 224/647; 224/699; 224/655; 224/669; 224/269; 224/930
(58) Field of Search ................................ 224/647, 648, 224/649, 655, 666, 669, 269, 930; D3/218

(56) References Cited

U.S. PATENT DOCUMENTS

| | | | |
|---|---|---|---|
| 4,479,596 A | * 10/1984 | Swanson | 224/236 |
| 4,573,573 A | * 3/1986 | Favaro | 206/216 |
| 4,771,927 A | * 9/1988 | Ventura | 224/250 |
| D345,646 S | * 4/1994 | Knapp | D3/218 |
| D345,647 S | * 4/1994 | Luxon | D3/218 |
| 5,535,928 A | * 7/1996 | Herring | 224/250 |
| D377,117 S | * 1/1997 | Klassen | D3/218 |
| 5,833,100 A | * 11/1998 | Kim | 224/197 |
| D416,132 S | * 11/1999 | Tan | D3/218 |
| 6,182,878 B1 | * 2/2001 | Racca | 224/236 |
| 6,330,430 B1 | * 12/2001 | Jensfelt | 206/305 |

* cited by examiner

Primary Examiner—Stephen K. Cronin
(74) Attorney, Agent, or Firm—Banner & Witcoff, Ltd.

(57) ABSTRACT

A cell phone pouch comprises an elongate strap with a pocket having elastic sides formed on one side of the strap. The pocket is open at both ends and the strap may be extended through the pocket to contain a cell phone in a manner that accommodates phones of various size. A retention flap and clip are incorporated with the pocket for attachment of the cell phone pouch to a belt or strap.

10 Claims, 3 Drawing Sheets

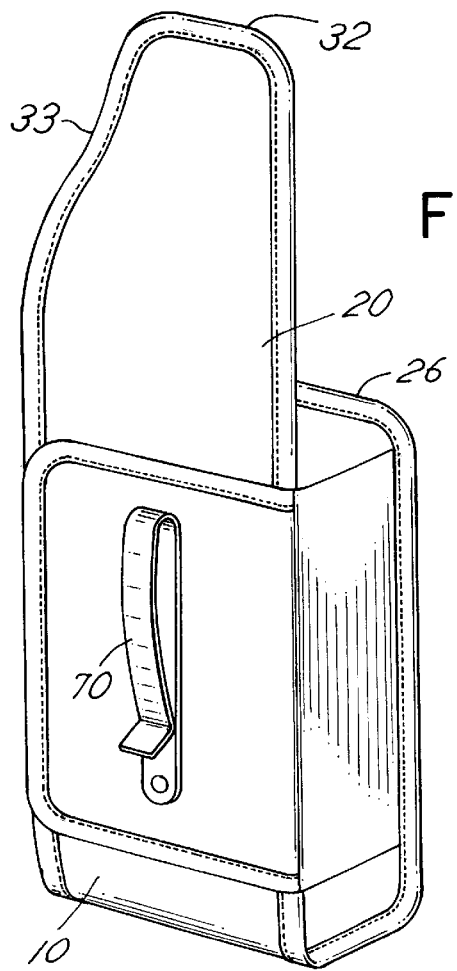
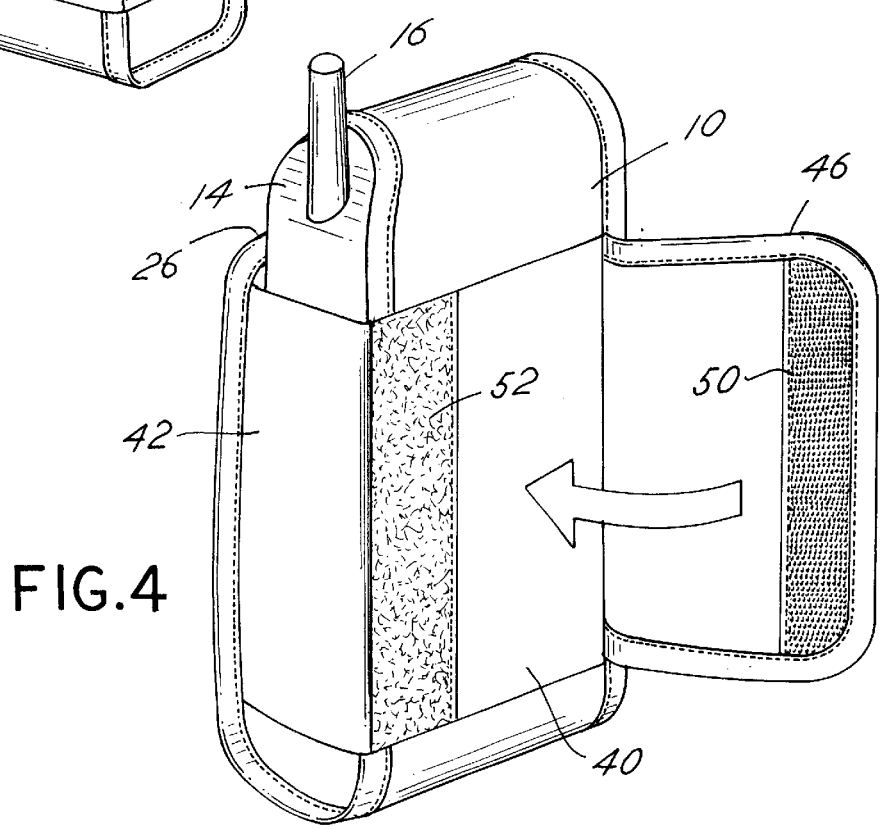

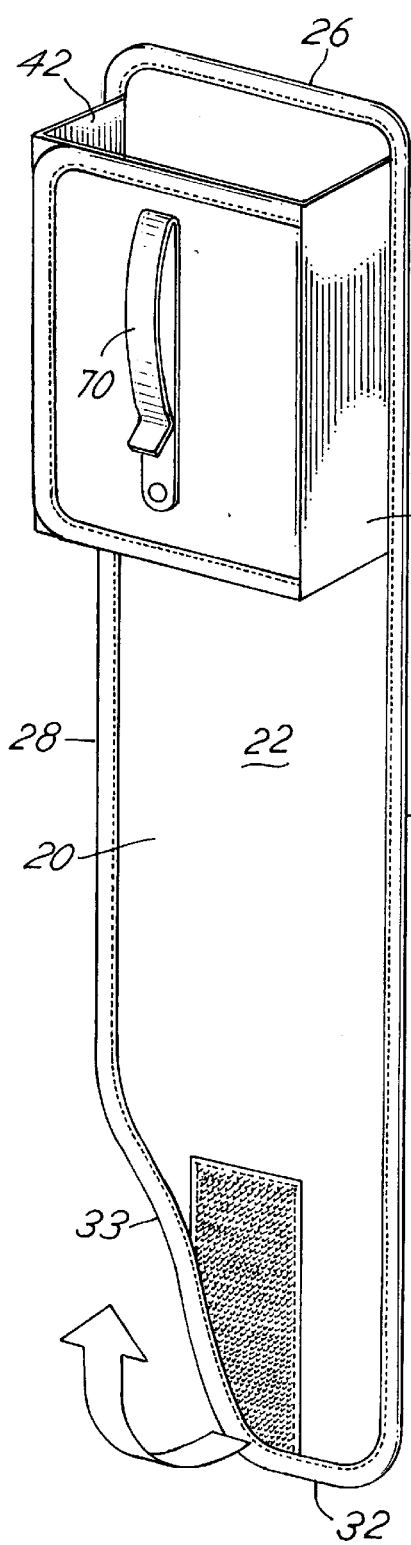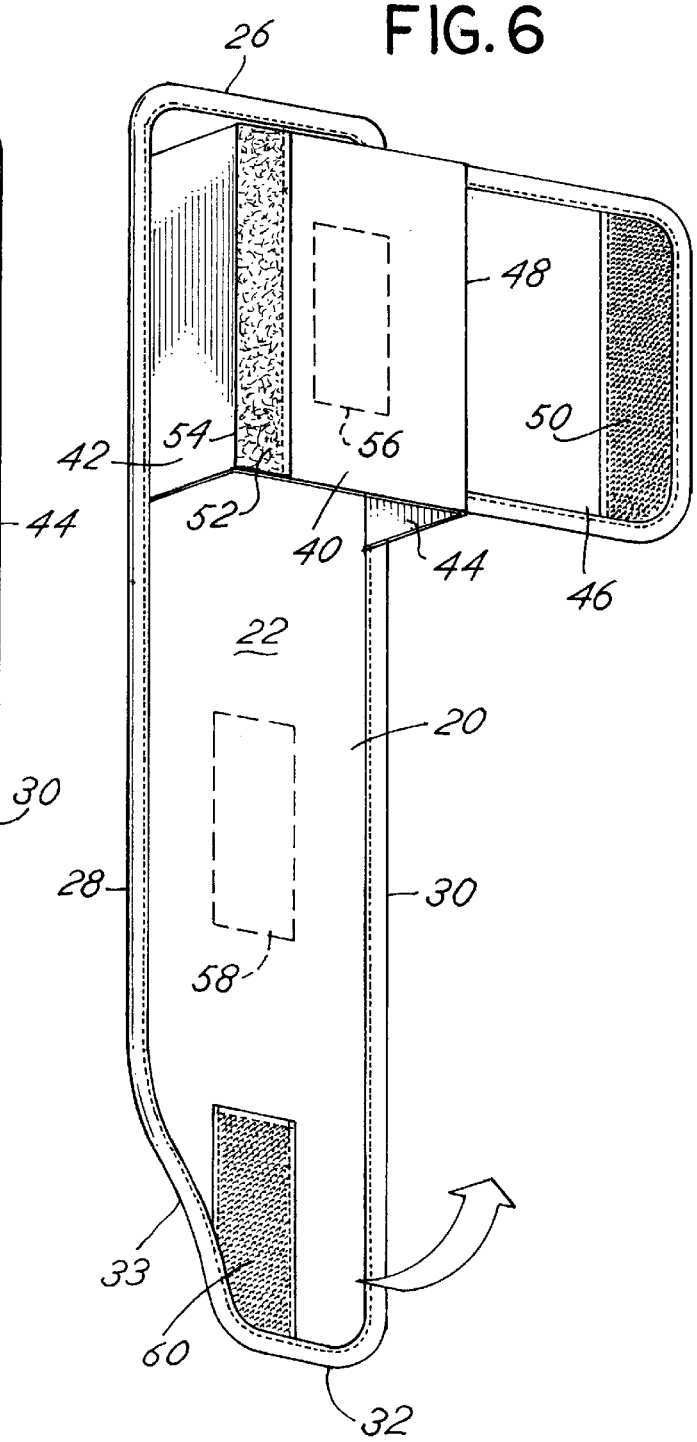

CELL PHONE POUCH

CROSS REFERENCE TO RELATED APPLICATION

This utility application claims the priority benefit of provisional application Serial No. 60/222,712 filed Aug. 3, 2000.

BACKGROUND OF THE INVENTION

In a principal aspect the present invention relates to a container or pouch for carrying of and protection of a cell phone or similar item.

The presence of cell phones in society is now commonplace. Many individuals carry such hand held phones in their brief case, purse, or the like. However, it is also commonplace for individuals to attach a cell phone to their belt or the strap of a purse or the like to maintain quick access to the phone. Cell phones, however, vary greatly in size and weight. Thus there has developed a need for a cell phone pouch or carrying case which will accommodate cell phones regardless of the size or dimension. The pouch must also be easily accessible, lightweight, and durable.

SUMMARY OF THE INVENTION

Briefly the present invention comprises a cell phone pouch including an elongate, flexible, flat strap with a pocket positioned on the interior surface of the strap. The strap is foldable and in combination with the pocket forms a carrier cavity for the phone. The formed pouch further includes a fastener such as a clip which enables attachment of the pouch to a belt or strap. The component parts of the pouch are adjustable inasmuch as the strap includes hook type fasteners, such as Velcro fasteners which enable folding of the component parts in a manner which accommodates cell phones of various sizes.

Thus it is an object of the invention to provide an improved cell phone pouch or carrying case.

It is a further object of the invention to provide a cell phone pouch which is comprised of elements which are adjustable in order to accommodate cell phones of various sizes.

A further object of the invention is to provide a cell phone pouch which is rugged, durable, inexpensive, lightweight, and attractive.

These and other objects, advantages, and features of the invention will be set forth in a detailed description which follows.

BRIEF DESCRIPTION OF THE DRAWING

In the detailed description that follows, reference will be made to the drawing comprised of the following figures:

FIG. 3 is an isometric view of the backside of the pouch of FIG. 2;

FIG. 4 is an isometric view of the pouch similar to FIG. 3 wherein the cell phone retention strap of the pouch is depicted in open position;

FIG. 5 is an isometric view of the pouch with the elongate cell phone retention strap in the unfolded position; and FIG. 6 is an isometric view similar to FIG. 5 depicting the elongated cell phone retention strap and a pocket that, in combination, form the pouch.

DESCRIPTION OF THE PREFERRED EMBODIMENT

Figure 1:
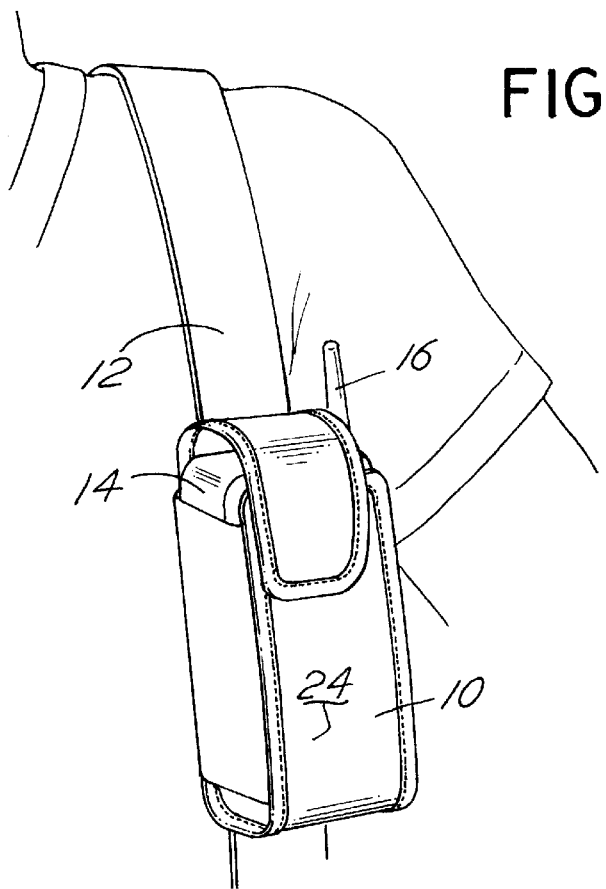
FIG. 1 is an isometric view of the cell phone pouch of the invention in an assembled condition illustrating attachment thereof to a shoulder strap.
Figure 2:
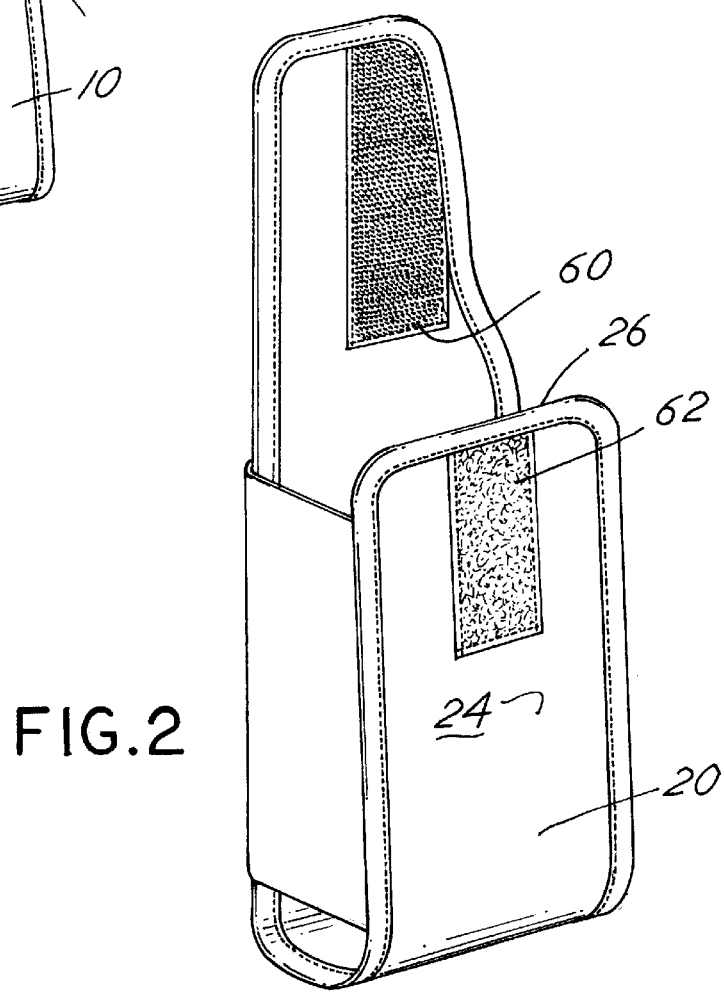
FIG. 2 is an isometric view of the cell phone pouch of FIG. 1 wherein the pouch is in the open condition ready to receive a cell phone.

FIG. 1 depicts the cell phone pouch of the invention attached to a shoulder strap 12, for example. Pouch 10 includes a cell phone 14 having a projecting antenna 16. The pouch 10 is fabricated from a flexible material such as plastic, canvas, or other fabric material. The pouch 10 is designed to accommodate cell phones of various size and dimension and to hold those phones tightly and securely for attachment to a strap, for example, strap 12 or for clipping on a belt, for example.

Thus, referring to the figures and in particular, FIGS. 5 and 6, the pouch 10 comprises an elongate, flexible cell phone strap 20 having an interior side 22 and an exterior side 24. The elongate strap 20 includes a top margin 26, a first side margin 28, a second side margin 30 which is parallel to and spaced from the first side margin 28, and a bottom margin 32. The bottom margin 32 is generally spaced from and parallel to the top margin 26. The bottom margin 32 is foreshortened or, in other words, the strap 20 has a section 33 which is cut away at its bottom end. The elongate strap 20, and more particularly, the first and second margins 28 and 30, extend perpendicular to the top margin 26. Thus, the strap 20 has a generally rectangular configuration except for the cut away corner section 33 adjacent the bottom margin 32.

Attached to the elongate strap 20 interior side 22 is a pocket comprised of a generally rectangular retention panel 40, a first connecting side panel 42 and a second connecting side panel 44. The retention panel 40, and more particularly the pocket formed thereby, is generally adjacent the top margin 26 and extends less than one-half the length of strap 20. The retention panel 40 is spaced from the strap 20 by the side panels 42 and 44. Either or both of the side panels 42 and 44 are made from an elastic material so that the distance of the panel 40 from strap 20 is adjustable and so that an item retained in the pocket defined thereby is snuggly and securely retained.

The panel 40 has a retention flap 46 attached thereto at juncture 48 of the side panel 44 and the retention panel 40. The flap 46 is thus foldable about juncture 48. The flap 46 includes fastening means, and more particularly, a hook and fabric fastening (Velcro) strip 50 cooperative with a compatible fastening means, i.e. hook and/or fabric 52 in the form of a strip on the outside of the panel 40. In this manner, the flap 46 may fit over a shoulder strap, for example, as depicted in FIG. 1. The strips 50 and 52 thus are adjacent the juncture 54 defined by the side panel 42 and the retention panel 40. Strips 50, 52 are typically a Velcro type fastener.

The inside of the retention panel 40 further includes a fastening means, namely, a hook or fabric material 56 which cooperates with a compatible fastening means, i.e. hook or fabric material 58 on the exterior 24 of the strap 20.

The bottom margin 32 includes a strip of fastening material adjacent thereto, namely, a fastening material strip 60 which cooperates with and fits into engagement with a fastening material strip 62 on the outside or exterior surface of the elongate strap 20 adjacent the top margin 26. Thus, various fastening means, and in this instance, fastening means made from Velcro fastening materials, are used for assembly of the pouch and retention of an item, i.e. the phone 14 in the pocket defined by the retention panel 40 and side panels 42 and 44.

The bottom margin 32 is folded through the opening defined by the panels 40, 42 and 44 so that the fastening means 58 will engage the fastening means 56. The bottom margin 32 may then be folded over an item (cell phone) 14 such as depicted in FIG. 1 to enclose the item 14 within the pouch 10 defined by the strap 20 and the pocket forming panels 40, 42 and 44. Because the engagement of the fastening means 58 and 56 as well as the fastening means 60 and 62 is adjustable, various sizes of cell phones 14 may be incorporated and stored in the pouch 10. Additionally, the elastic side panels 42 and 44 provide further means for accommodating variously sized objects, i.e. cell phones 14. The flap 46 may fold over a shoulder strap 12, as depicted, or over a belt. Alternatively, and optionally, the flap 46 may include a clip 70 as depicted in FIG. 5 attached to the outside surface of the flap 46. The clip 70 may then be used to retain the pouch 10 on a belt or another item, such as a waistband or the like.

The material which is used to form the pouch 10, the use of elastic panels 42, 44 on one or both sides of the retention panel 40, the use of a retention panel 40 which is made from an elastic material, the use of multiple bands of elastic material rather than single panels 42, 44 as depicted, the shape of the cutout for the antenna 16 as formed in the strap 20 and various other modifications may be made to the pouch 10 without departing from the spirit and scope of the invention. The invention is therefore to be limited only by the following claims and equivalents thereof.

What is claimed is:

1. A cell phone pouch comprising in combination:

an elongate strap having a top margin, a bottom margin spaced from the top margin, a first side margin, a second side margin parallel to and spaced from the first side margin, said side margins generally perpendicular to the top margin, an interior side surface and an exterior side surface, said strap comprising a foldable, flexible material;

a pocket formed on the interior side surface of said strap adjacent the top margin, said pocket extending from adjacent the top margin toward the bottom margin less than one half the length of the side margins, said pocket including a generally rectangular retention panel spaced from and parallel to the strap, and first and second side panels connecting the retention panel to the elongate strap to form a passage between the retention panel and elongate strap with first and second open ends to said passage, said first open end adjacent the top margin and said second open end at the end of the retention panel opposite the top margin;

said elongate strap being foldable to insert the bottom margin through the second open end into said passage and extending outwardly from the first end so as to be foldable over the top margin to enclose an object in the pocket;

fastening means for retaining the elongate strap against the exterior surface to enclose an object in the pocket; and a retaining flap flexibly attached to the juncture of one of said side panels and the retention panel, said retention flap foldable over the retention panel for attachment thereto and providing a means for holding the pocket and the contents of the pocket attached to a strap or belt.

2. The pouch of claim 1 wherein the pocket side panels are elastic.

3. The pouch of claim 1 further including a retention clip on the flap for attachment to a strap or belt.

4. The pouch of claim 1 wherein the bottom margin is dimensionally less than the top margin to define an opening in the enclosure of the strap and pocket for an antenna to project therethrough.

5. The pouch of claim 1 wherein the fastening means comprise hook and fabric fasteners.

6. The pouch of claim 1 wherein fastening means are provided on the exterior surface of the strap and the interior of the retention panel.

7. The pouch of claim 1 wherein fastening means are provided on the interior surface of the strap adjacent the bottom margin and on the exterior surface of the strap adjacent the top margin.

8. The pouch of claim 1 wherein fastening means are provided on the exterior of the pocket retention panel and the inside of the retaining flap.

9. The pouch of claim 1 wherein fastening means are provided on the exterior of the flap.

10. The pouch of claim 9 wherein the fastening means comprise a clip for attaching the pouch to a belt.

* * * * *